United States Patent Office.

CHARLES MARCHAND, OF NEW YORK, N. Y., ASSIGNOR TO LEONARD F. BECKWITH, ÉTIENNE GILLET, AND AUGUSTE J. ROSSI, TRUSTEES, OF SAME PLACE.

COMPOUND FOR USE IN REFRIGERATING-MACHINES.

SPECIFICATION forming part of Letters Patent No. 275,834, dated April 17, 1883.

Application filed August 17, 1882. (No specimens.)

*To all whom it may concern:*

Be it known that I, CHARLES MARCHAND, of the city, county, and State of New York, have invented a new and useful Improvement in Compounds for Use in Refrigerating-Machines, which invention is fully set forth in the following specification.

My invention is an improvement upon the invention set forth in Letters Patent of the United States granted to Auguste J. Rossi and Leonard F. Beckwith for improvements in the production of cold for making ice, and for other purposes, dated January 18, 1881, No. 236,843. In that patent advantage is taken of the fact that ammonia-gas is absorbed by glycerine in large quantities, the absorption taking place with a great disengagement of heat, and the liquid thus obtained by saturation having little or no pressure at ordinary temperatures. The absorbent is non-volatile, and incapable of being vaporized under the vacuum produced mechanically by an aspiration and compression pump, the absorbed material volatilizing alone under the vacuum; and a special mechanical contrivance—such as a double refrigerator—is used to effect the absorption of the vapors of volatile absorbed material, so as to reconstitute the saturated liquid. Experience has shown that the use of glycerine in the manner spoken of in said patent is attended with certain difficulties and inconveniences. The liquid is liable to become viscous, and does not freely abandon the gas ammonia under a vacuum where the glycerine is used in a highly-concentrated or anhydrous form, and if the glycerine is used in a less concentrated form there is a danger of freezing taking place in the solution at a comparatively high temperature. There is also produced by the ammonia on the glycerine a sort of saponification, or, more properly, a kind of emulsion, which makes the mass foam to such an extent as to impair the working of the ice-machine in which the process referred to is carried on. In my invention these difficulties are obviated and the efficiency of the machine and process described in said Patent No. 236,843 is greatly increased.

In place of using glycerine more or less concentrated, I use a compound composed of thirty parts of alcohol, thirty parts of pure glycerine, and forty parts of water, by weight. The liquid thus obtained has about the specific gravity of water, and is perfectly fluid or mobile. It absorbs several hundred times its volume of ammonia gas. When thus saturated with ammonia it is lighter than water and more fluid or mobile, allowing a free escape of the gas ammonia from the saturated solution when subjected to the action of a pump or other means of producing a vacuum. It is capable of enduring a very low temperature without freezing. By the use of this liquid with ammonia gas I have been able without difficulty to produce an effective temperature in a refrigerating-machine of from zero to 5° Fahrenheit.

The above proportions of alcohol, glycerine, and water may be varied; but I consider that the best result can be produced by using the proportions stated. The ordinary alcohol may be replaced by other alcohol soluble in water and glycerine.

What I claim as my invention, and desire to secure by Letters Patent, is—

1. An absorbent liquid composed of alcohol, glycerine, and water, adapted to be used for the purposes of refrigeration, substantially as described.

2. An absorbent liquid composed of alcohol, glycerine, and water, saturated with ammonia gas, adapted to be used for the purposes of refrigeration, substantially as described.

3. The addition of alcohol to an absorbent liquid to cause a free escape of the absorbed gas used in a process of refrigeration, substantially as described.

In testimony whereof I have signed this specification in the presence of two subscribing witnesses.

CH. MARCHAND.

Witnesses:
 J. DRAKE,
 JOHN FARRELL.